Nov. 25, 1969     J. E. HOOVER     3,479,986

APPARATUS FOR LIQUID SOLVENT SEALING OF PLASTIC FILM CARTRIDGES

Filed Sept. 22, 1967     2 Sheets-Sheet 1

*INVENTOR.*
James E. Hoover

*ATTORNEY*

Nov. 25, 1969   J. E. HOOVER   3,479,986
APPARATUS FOR LIQUID SOLVENT SEALING OF PLASTIC FILM CARTRIDGES
Filed Sept. 22, 1967   2 Sheets-Sheet 2
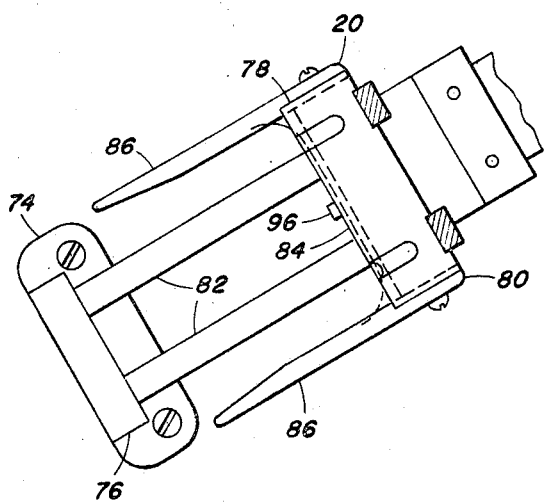
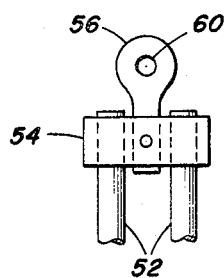
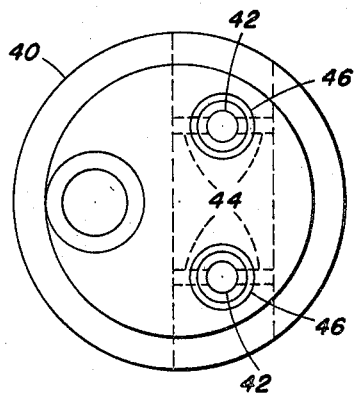
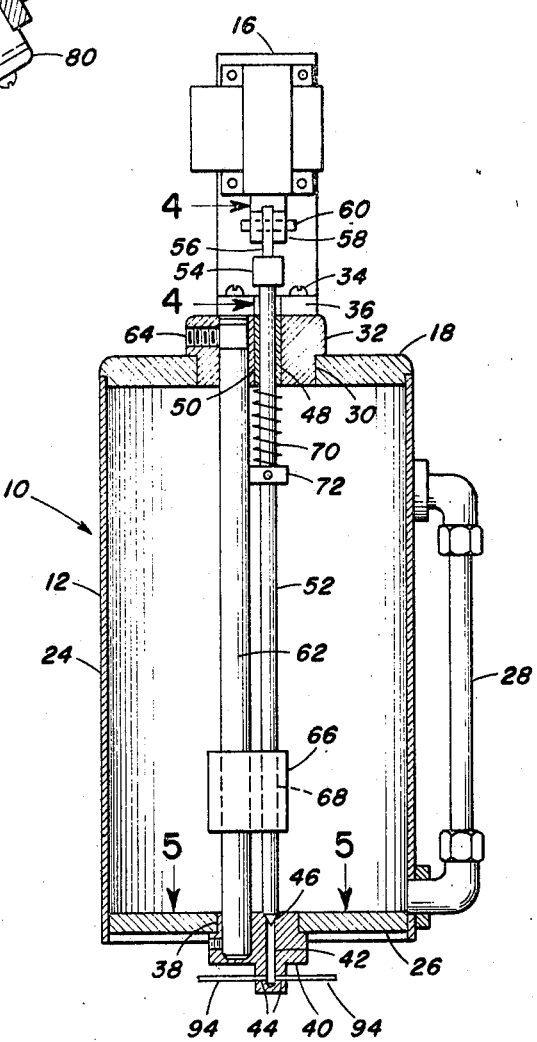
Fig. 2.
Fig. 3.
Fig. 4.
Fig. 5.
INVENTOR.
James E. Hoover
BY
Edward H. Loveman
ATTORNEY United States Patent Office 3,479,986
Patented Nov. 25, 1969

3,479,986
APPARATUS FOR LIQUID SOLVENT SEALING OF PLASTIC FILM CARTRIDGES
James E. Hoover, Binghamton, N.Y., assignor to GAF Corporation, New York, N.Y., a corporation of Delaware
Filed Sept. 22, 1967, Ser. No. 669,828
Int. Cl. B05c *11/14;* B65b *7/16*
U.S. Cl. 118—2    7 Claims

ABSTRACT OF THE DISCLOSURE

This invention relates to an apparatus adapted to dispense a liquid solvent sealer for plastic film cartridges. In essence, a receptacle containing liquid solvent is adapted to dispense a quantity of the solvent through a hypodermic needle arrangement whereby the solvent contacts the cartridge. The solvent which will fuse the cartridge is dispensed when the cartridge is positioned on a support so as to energize a microswitch, which in turn starts an electric timer that controls a solenoid operated valve mechanism. De-energization of the solenoid valve by the timer cuts off the flow of solvent. The cycle cannot be repeated without removing the cartridge from the support thereby repositioning the microswitch to its cocked position.

---

This invention relates to a cartridge sealing apparatus and, more particularly, to a solvent fluid dispensing apparatus for the solvent sealing of plastic film cartridges.

The greatly increased popularity and commercial acceptance of photographic equipment utilizing film cartridges has created a widespread need for improved and more efficient high-speed film cartridge assembling and sealing apparatuses and methods. In industry, various types of film cartridge sealing apparatuses have been and are being successfully employed. Among these apparatuses are those which utilize processes dependent upon the heat-sealing, pressure and heat sealing, ultrasonic sealing, and fluid solvent sealing of plastic film cartridges. Although all of these film cartridge sealing processes have been and are deemed to be generally satisfactory, of particularly advantageous application has been the process related to the solvent sealing of plastic film cartridges.

Generally, the solvent sealing of plastic film cartridges, which are usually constituted of polystyrene plastic components, consist of imparting a predetermined quantity of a fluid plastic solvent to the surface of the film cartridge to be sealed. The fluid solvent will, in a manner well known in the technology, chemically react with the cartridge plastic material so as to soften the latter, and cause the plastic or polystyrene to fuse or bond with an adjacent contiguous layer of plastic material. In effect, this will seal the two layers of plastic material, which may, for example, be the cover and side wall portions of an assembled plastic film cartridge. Whereas, heat or thermal, heat and pressure, or ultrasonic sealing of plastic film cartridges requires cumbersome, expensive apparatuses and equipment, and the employment of skilled operating personnel, the fluid solvent sealing process for film cartridges may be used in conjunction with simple apparatuses operated in an efficient manner by relatively unskilled operators.

In order to implement the efficient fluid solvent sealing of plastic film cartridges at high rates of production, the present invention provides for a novel and unique fluid solvent dispensing apparatus which is adapted to impart a predetermined quantity of fluid solvent to the surface areas of the cartridges. Essentially, the fluid solvent dispensing apparatus includes a receptacle containing a quantity of fluid solvent, a film cartridge support device positioned in proximity to the receptacle, a dispensing unit including a hypodermic needle arrangement for conveying fluid solvent from the receptacle into contact with the film cartridge, and an energizing device and solenoid-operated valve adapted to facilitate and control flow of the fluid solvent in response to positioning of the film cartridge on the support device. The fluid solvent apparatus may be readily and in a simple manner operated by unskilled personnel to produce sealed plastic film cartridges at high production speeds.

Accordingly, it is a primary object of the present invention to provide an improved and novel apparatus for the fluid solvent sealing of plastic film cartridges.

Another object of the present invention is to provide a novel fluid solvent dispensing apparatus including an actuatable valve adapted to impart predetermined quantities of sealing solvent to the surface areas of plastic film cartridges.

A more specific object of the present invention is to provide a fluid solvent dispensing and sealing apparatus as herein described which incorporates solenoid operated valve means actuated in response to the positioning of a film cartridge on the apparatus so as to eject a sealing fluid solvent through a hypodermic needle arrangement onto the surfaces of the film cartridge.

These and other objects and many of the attendant advantages of this invention will be readily appreciated as the same becomes better understood by reference to the following detailed description when considered in connection with the accompanying drawings in which:

FIG. 2 is a sectional elevational view along line 2—2 in FIG. 1;

FIG. 3 is a plan view in the direction of line 3—3 in FIG. 1;

FIG. 4 is a fragmentary sectional view along line 4—4 in FIG. 2; and

FIG. 5 is an enlarged sectional view along line 5—5 in FIG. 2.

Figure 1:
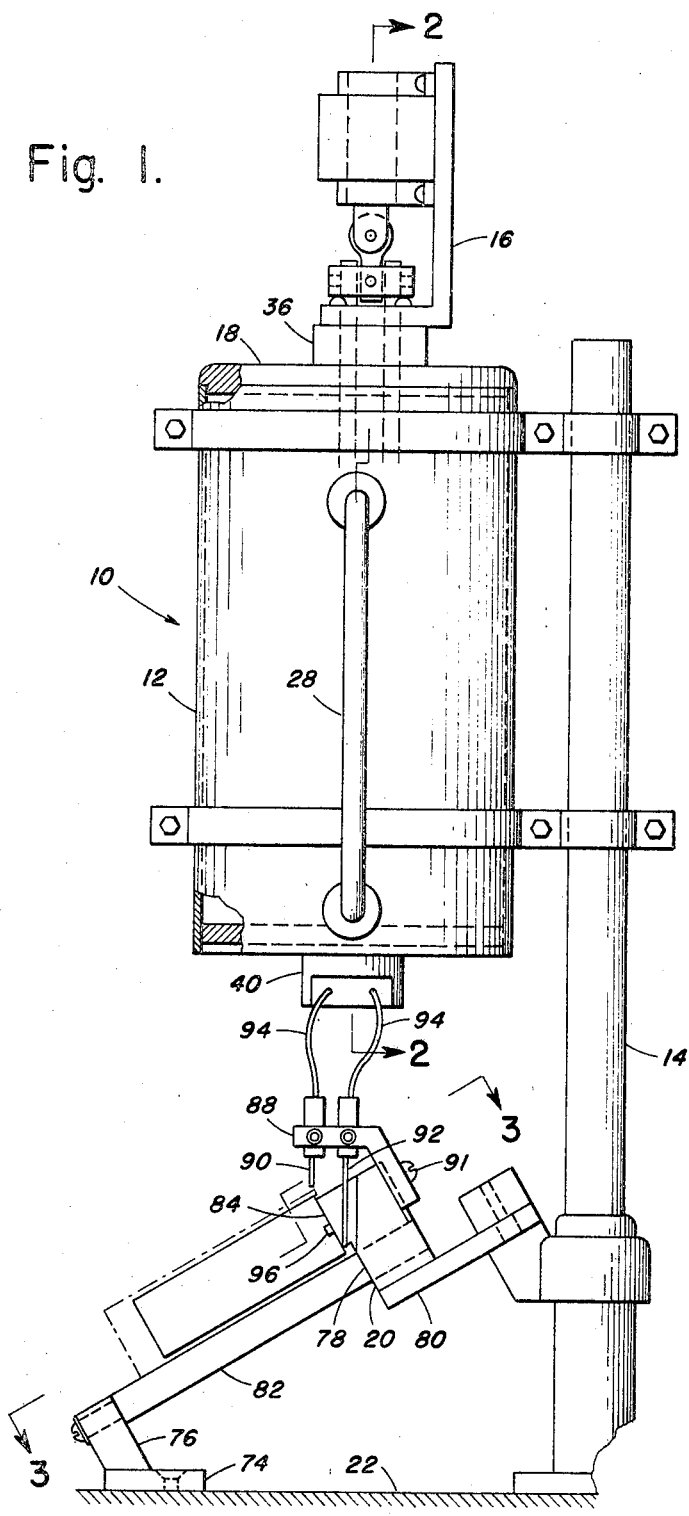
FIG. 1 is an elevational side view, partially in section, of a fluid solvent dispensing and sealing apparatus according to the present invention.

Referring now to the drawings, wherein like reference characters designate like or corresponding parts throughout the several views, FIG. 1 illustrates a fluid solvent and dispensing sealing apparatus which is generally designated as 10. The apparatus 10 includes a receptacle 12 which may be of cylindrical construction and which is adapted to be mounted on a vertical support stand 14. A solenoid 16 may be mounted on an upper surface portion 18 of receptacle 12. Below receptacle 12, an inclined cartridge support assembly 20 is positioned on a substantially horizontal plate member 22, the latter of which also supports vertical support stand 14.

The receptacle 12, which may be formed of stainless steel or similar material, consists essentially of an upright cylindrical wall portion 24, a bottom sealing flange surface 26 and the upper surafce or cover portion 18, so as to constitute a closed container. A glass level gauge 28 is attached to cylindrical wall 24 so as to afford a view of the amount of fluid solvent available within receptacle 12.

An aperture 30 is provided in cover portion 18 to allow insertion of a cylindrical insert 32 in the cover portion 18. The solenoid 16 is fastened to a cylindrical insert 32 by means of suitable threaded fasteners 34 extending through solenoid mounting flanges 36.

Similarly, the bottom sealing flange 26 of receptacle 12 includes an aperture 38 which provides for the insertion and mounting of a dispenser insert 40 in the flange 26. Essentially, both inserts 32 and 40 in the upper and lower portions of receptacle 12 are mounted so as to be axially in line with each other.

The insert 40, which in essence comprises a fluid dispenser, has two vertically extending holes 42 extending a substantial portion therethrough in communication with the interior of receptacle 12. Adjacent to the lower edge of insert 40, each of the vertical holes 42 is intersected by two horizontal holes or passageways 44, which place the interior of receptacle 12 into fluid dispensing communication with the exterior of the receptacle. The upper ends of vertical holes 42 are provided with chamfers which are adapted to form valve seats 46.

Insert 32 is provided with two apertures 48 which are in vertical alignment with holes 42 in insert 40. Each of the apertures 48 has inserted therein a hollow slide bushing 50. An elongated rod member 52, preferably constituted of stainless steel or the like, extends into the interior of receptacle 12 through each of bushings 50. The lower ends of rod members 52, which reach the bottom of receptacle 12, are shaped so as to form valves which are complementary to the configuration of valve seats 46, and are adapted to mate with the latter in fluid sealing engagement.

The upper ends of rod members 52 are joined by a horizontal cross-bar 54, as shown in FIGS. 2 and 5, above solenoid flanges 36. At the center of cross-bar 54 an upwardly extending tongue 56 is adapted to be attached to a clevis-type lower end 58 of the reciprocatable plunger of solenoid 16 by means of a suitable fastening pin 60.

In order to maintain the rod members 52 in perfect alignment with valve seats 46, the inserts 32 and 40 may be interconnected by a rod 62 extending through receptacle 12 and fastened to insert 32 through a set screw 64. A guide bushing 66, preferably formed of a low-friction material such as polytetrafluoroethylene (Teflon) is attached to rod 62 in the proximity of insert 40. The guide bushing 66 includes passageways 68 affording guided sliding support for the lower portions of rod members 52.

Each of the rod members 52 includes a compressed tension spring 70 interposed interiorly of receptacle 12 between slide bushings 50 and retaining flanges 72 mounted on each of the rod members 52. This, in effect, will urge the lower ends of rod members 52 into normally fluid sealing engagement with their respective coacting valve seats 46.

Positioned below receptacle 12 and dispenser insert 40, the cartridge support assembly 20 includes a mounting flange 74 which is fastened to plate member 22 through suitable fastening means. An upwardly inclined bracket 76 extends from mounting flange 74. Similarly, an inclined bracket 78 is mounted on a flange 80, the latter of which may be fastened to vertical support stand 14. Brackets 76 and 78 may be connected by a pair of parallel spaced rods 82. The rods 82 provide support surfaces for a loaded film cartridge placed thereon and adapted to be sealed by apparatus 10. Bracket 78 includes a front surface 84 and side guide rail projections 86 which assure the proper positioning of a film cartridge on support assembly 20, as illustrated in FIG. 3 of the drawings.

A pair of generally inverted L-shaped support brackets 88 are attached to bracket 78 through suitable threaded fasteners 91. Each of the brackets 88 has mounted thereon two hypodermic needle or syringe arrangements 90 and 92 in spaced relationship. Forward hypodermic needles 90 are at a higher elevation than rearward needles 92 so as to be in line with the forward inclined upper edge of a film cartridge. Similarly, rear needles 92 extend further down so as to be in line and proximate to the lower seam or edge of the film cartridge. The hypodermic needles 90 and 92 are each connected to one of the passageways 44 in dispenser insert 40 through suitable fluid conduits 94.

A microswitch (not shown) is positioned within bracket 78 and includes a contact arm or plunger 96 extending forward of surface 84, and which is adapted to be contacted by a film cartridge positioned on the cartridge support assembly 20.

During operation, the receptacle 12 is filled with a predetermined quantity of a fluid sealing solvent, the amount of which may be readily determined visually through level gauge 28. The fluid solvent preferably employed in the sealing of plastic, particularly polystyrene, film cartridges is a form of styrene cement constituted essentially of a solution containing by weight 55 parts of chlorothene, 15 parts of methylene chloride, 5 parts of isopropyl alcohol (99%), and 25 parts of petroleum ether (90–100° flashpoint).

When an operator positions a loaded plastic film cartridge on rods 82 between guide rail projections 86 and in contact with the forward surface 84 of bracket 78, the cartridge comes into contact with microswitch contact plunger 96. This, in turn, will actuate an electric timer (not shown) which will energize the solenoid 16 and raise the solenoid plunger in a manner well known in the electrical art. Since the upper ends of rod members 52 are attached to the solenoid plunger through cross-bar 54 and tongue-and-clevis joint 56, 58, upward movement of the solenoid plunger will raise the lower valve ends of rod members 52 off valve seats 46.

As the rod members 52 lift away from valve seats 46, fluid solvent will flow from receptacle 12 through the dispenser insert 40, conduits 94 and hypodermic needle arrangements 90, 92 under the influence of gravity. The fluid solvent ejected through the hypodermic needle arrangements will flow along the upper and lower film cartridge edge surfaces and seal the latter almost instantaneously. In order to avoid syphoning of the fluid solvent in the hypodermic needle arrangement, the two upper needles 90 are connected to the passageways 44 of one hole 42, whereas the lower needles 92 are connected to the passageways 44 of the other hole 42 in dispenser insert 40.

Since the flow of solvent along the edges of the plastic film cartridge, and the resultant sealing effect, is quite rapid, the cartridge need be positioned on the support assembly only a very short period of time. After a predetermined period of time, i.e. $\%_{10}$ of a second, the electric timer will de-energize the solenoid 16 and permit its plunger to drop down. Positive downward motion to the solenoid plunger and valve rod members 52 is imparted by the forces generated through compressed tension spring 70 which encompass the rod members 52. Consequently, the valve ends or lower extremities of rod members 52 will seat themselves firmly in fluid-sealing relationship on valve seats 46, thereby shutting off the flow of fluid solvent from receptacle 12. The aforedescribed sequence of operation may then be repeated for subsequent film cartridges.

It should also be understood that the foregoing relates to only a preferred embodiment of the invention, and that it is intended to cover all changes and modifications of the example of the invention herein chosen for the purposes of the disclosure, which do not constitute departures from the spirit and scope of the invention.

What is claimed is:

1. A solvent dispensing apparatus for sealing plastic film cartridges or the like comprising in combination:
   a receptacle containing a quantity of a solvent fluid,
   a solvent dispenser fastened to said receptacle and communicating with the interior thereof,
   actuatable valve means associated with said receptacle, said valve means being adapted to maintain said dispensing means in normally fluid sealed relationship,
   a cartridge support means,
   at least one solvent fluid ejecting means attached to said cartridge support means,
   conduit means interconnecting said ejecting means and said solvent dispenser, and
   valve actuating means connected to said valve means, said cartridge support means including energizing means adapted to actuate said valve actuating means in response to positioning of a cartridge upon said support means, so as to permit flow of solvent fluid from said receptacle through said dispenser means and ejecting means into surface contact with said cartridge.

2. An apparatus as defined in claim 1 wherein said valve actuating means comprises a solenoid, said solenoid including a reciprocatable plunger,
said valve means including at least one elongate rod member attached to said plunger and extending into said receptacle,
said dispensing means including at least one solvent fluid dispensing orifice,
a valve seat disposed within said orifice, said rod member being adapted to engage said valve seat so as to normally maintain said orifice in fluid sealed relationship.

3. An apparatus as defined in claim 2, wherein said solenoid plunger includes a yoke,
a pair of said rod members attached to said yoke and extending in parallel, spaced relation into said receptacle, said dispensing means including a pair of said orifices, and
one of said valve seats being disposed in each of said orifices and adapted to be each engaged, respectively, by one of said rod members.

4. An apparatus as defined in claim 3 wherein each of said orifices includes a plurality of fluid flow apertures,
said ejecting means comprising a plurality of solvent fluid nozzle means, and
said conduit means including a plurality of conduits, each of said conduits being adapted to interconnect one of said apertures and one of said nozzle means.

5. An apparatus as defined in claim 4 wherein said nozzle means extend into predetermined spaced relationships with said cartridge support means so as to concurrently facilitate solvent sealing of the upper and lower surface portions of film cartridges.

6. An apparatus as defined in claim 4 wherein said cartridge support means comprises an inclined support surface and cooperating guide means adapted to position a cartridge in predetermined position below said nozzle means.

7. An apparatus as defined in claim 1 wherein said solvent fluid adapted to seal said film cartridge through surface contact comprises a solution constituted by weight per 100 parts, of 55 parts chlorothene, 15 parts methylene chloride, 5 parts isopropyl alcohol, and 25 parts petroleum ether.

References Cited
UNITED STATES PATENTS

| | | | |
|---|---|---|---|
| 2,764,123 | 9/1956 | Derderian | 118—216 |
| 3,252,441 | 5/1966 | Hargreaves | 118—2 |

HOUSTON S. BELL, JR., Primary Examiner

U.S. Cl. X.R.

118—8, 216; 141—361; 156—578